United States Patent [19]

Fiterman et al.

[11] Patent Number: 5,137,212
[45] Date of Patent: Aug. 11, 1992

[54] SECURITY DISPOSAL CABINET WITH REMOVABLE INTERNAL CONTAINER PARTICULARLY FOR RECYCLEABLE CONFIDENTIAL WASTE PAPER MATERIAL

[75] Inventors: Benjamin Fiterman; Rebecca L. Waterston, both of Golden Valley; Mark A. Feucht, Champlin; Stanley R. Thorud, Plymouth, all of Minn.

[73] Assignee: Liberty Diversified Industries, New Hope, Minn.

[21] Appl. No.: 756,043

[22] Filed: Sep. 6, 1991

Related U.S. Application Data

[62] Division of Ser. No. 542,821, Jun. 25, 1990, Pat. No. 5,105,968.

[51] Int. Cl.[5] .................. B65D 91/00; B65G 11/04; E06B 7/32
[52] U.S. Cl. .................. 232/43.2; 232/47; 109/46; 109/66; 109/73
[58] Field of Search .................. 232/43.1, 43.2, 45, 232/47; 109/46, 55, 66, 73; 312/327, 328, 333

[56] References Cited

U.S. PATENT DOCUMENTS

| | | | |
|---|---|---|---|
| 3,799,430 | 3/1974 | Huguenin | 232/43.2 |
| 3,976,345 | 8/1976 | Walters | 232/47 |
| 3,981,436 | 9/1976 | Neal | 232/43.2 |
| 4,715,498 | 12/1987 | Hanifl | 232/43.1 |

Primary Examiner—Neill R. Wilson
Attorney, Agent, or Firm—Moore & Hansen

[57] ABSTRACT

A cabinet and container assembly comprising an enclosed cabinet having an upper opening and a lower opening. The upper opening is equipped with a pivotal disposal door. The lower opening has a hinged door, and is dimensioned such that a wheeled container may be positioned inside and locked within the cabinet. The pivotal door can be pulled forward to an open position presenting a horizontal tray on which waste materials may be rested, with the waste materials sliding along a top chute surface of the pivotal door when it is pivoted upwardly to a closed position, the waste materials sliding rearwardly and downwardly along the chute surface and across the rear edge of the pivotal door, thereby falling downwardly into the center of the open topped container. An curved upper partition positioned within the interior of the cabinet above the pivotal door and closely adjacent the read edge thereof prevents a person from reaching inside the cabinet and accessing the container when the door is paritally opened. The pivotal door provides an handgrip opening generally in the shape of an inverted triangle which may be comfortable gripped by persons of different heights. The container includes a hinged and lockable lid which provides handgrip openings when the lid is open or closed, and castered wheels for rolling the container. The containers may be positioned on a transport cart with the castered wheels engaging the frame members of the cart, or stacked in a column on their sides for transit.

12 Claims, 4 Drawing Sheets

FIG. 4

SECURITY DISPOSAL CABINET WITH REMOVABLE INTERNAL CONTAINER PARTICULARLY FOR RECYCLEABLE CONFIDENTIAL WASTE PAPER MATERIAL

This is a divisional of application Ser. No. 07/542,821, filed Jun. 25, 1990, now U.S. Pat. No. 5,105,968 issued on Apr. 21, 1992.

BACKGROUND OF THE INVENTION

This invention relates generally to cabinets for the receipt of disposable waste materials, and particularly a security cabinet for the disposal of confidential papers to be recycled used in combination with a plurality of movable containers In many office settings, it is necessary to provide some means for the disposal of papers and other waste material containing information having a secret or confidential nature. These papers are generally placed within an enclosed upright metal receptacle having a slotted depository opening, and are collected by a security officer to be shredded or burned at the end of each business day. The waste materials may be collected in a large bag, and placed within a wheeled cart for transportation to the disposal facility. Due to their bulky size and the need for access by the collecting officer, these disposal receptacles are generally positioned in centralized locations in an office, such as in the hallways or copy rooms. There is an increasing trend to recycle all types of paper waste materials, and services have arisen which collect and recycle security waste materials. However, conventional security waste disposal receptacles present several obstacles to these services. Besides being very heavy and immobile, these conventional receptacles require that the waste materials be removed and placed in an unsecured bin or cart for transport to a truck utilized by the service for transporting the waste to a recycling facility, or else transported to the truck in a cumbersome closed transport container.

BRIEF SUMMARY OF THE INVENTION

It is therefore one object of this invention to design a security disposal cabinet and container assembly which may be supplied by a security recycling service and positioned unobtrusively within an office setting adjacent to conventional drawered filing and storage cabinets.

It is yet another object of this invention to design the above cabinet and container assembly such that large stacks or loads of wide paper (such as computer printouts) can be easily discarded therein, and such that unauthorized persons cannot remove or peruse the waste materials after they have been discarded.

It is an additional object of this invention to design the above cabinet and container assembly such that persons from the security service may easily remove the filled containers from the cabinet, replace those containers with empty containers, and easily transport the filled containers to a truck or other remote facility. It is a related object of this invention to design the above cabinet and container assembly such that the filled containers removed from the cabinet may be secured in a closed position to further prevent removal or perusal of the waste materials during transit.

Briefly described, the cabinet and container assembly of this invention comprises an enclosed cabinet having an upper opening and a lower opening. The upper opening is equipped with a pivotal disposal door. The lower opening has a hinged door, and is dimensioned such that a wheeled container may be positioned inside and locked within the cabinet. The pivotal door can be pulled forward to an open position presenting a horizontal tray on which waste materials may be rested, with the waste materials sliding along a top chute surface of the pivotal door when its is pivoted upwardly to a closed position, the waste materials sliding rearwardly and downwardly along the chute surface and across the rear edge of the pivotal door, thereby falling downwardly into the center of the open topped container. A curved upper partition positioned within the interior of the cabinet above the pivotal door and closely adjacent the rear edge thereof prevents a person from reaching inside the cabinet and accessing the container when the door is partially opened. The pivotal door provides an handgrip opening generally in the shape of an inverted triangle which may be comfortable gripped by persons of different heights. The container includes a hinged and lockable lid which provides handgrip openings when the lid is open or closed, and castered wheels for rolling the container. The containers may be positioned on a transport cart with the castered wheels engaging the frame members of the cart, or stacked in a column on their sides for transit.

BRIEF DESCRIPTION OF THE DRAWINGS

FIG. 4 is a side section view of the security disposal cabinet of FIG. 1 taken through line 4—4 of FIG. 3;

DESCRIPTION OF THE PREFERRED EMBODIMENT

The security disposal cabinet and container assembly of this invention is shown in FIGS. 1-13 and referenced generally therein by the numeral 10.

Figure 1:
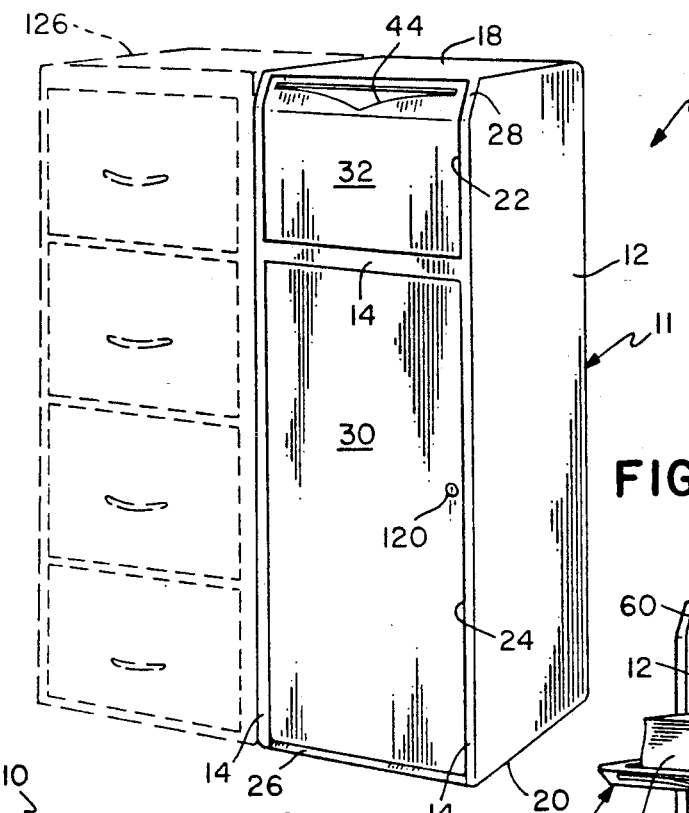
FIG. 1 is a front perspective view of the security disposal cabinet of this invention positioned adjacent to a conventional file cabinet.
Figure 2:
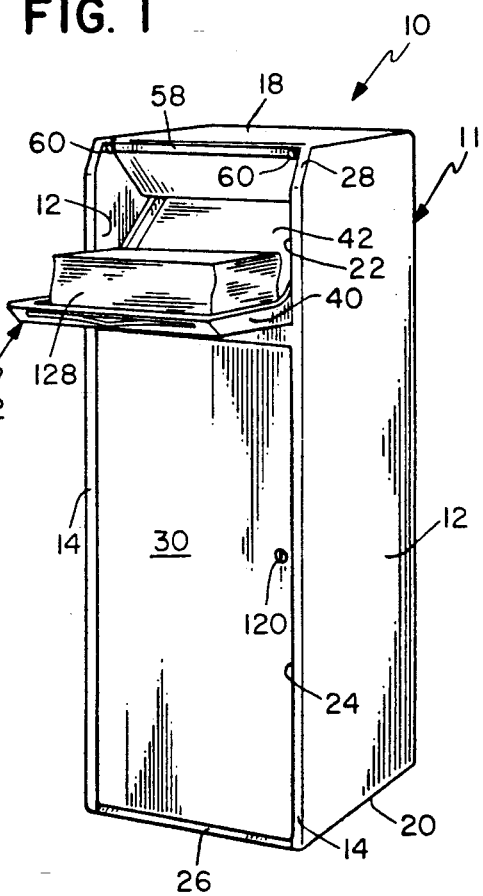
FIG. 2 is a front perspective view of the security disposal cabinet of FIG. 1 with the pivotal door open and a stack of waste paper placed thereon.
Figure 4:
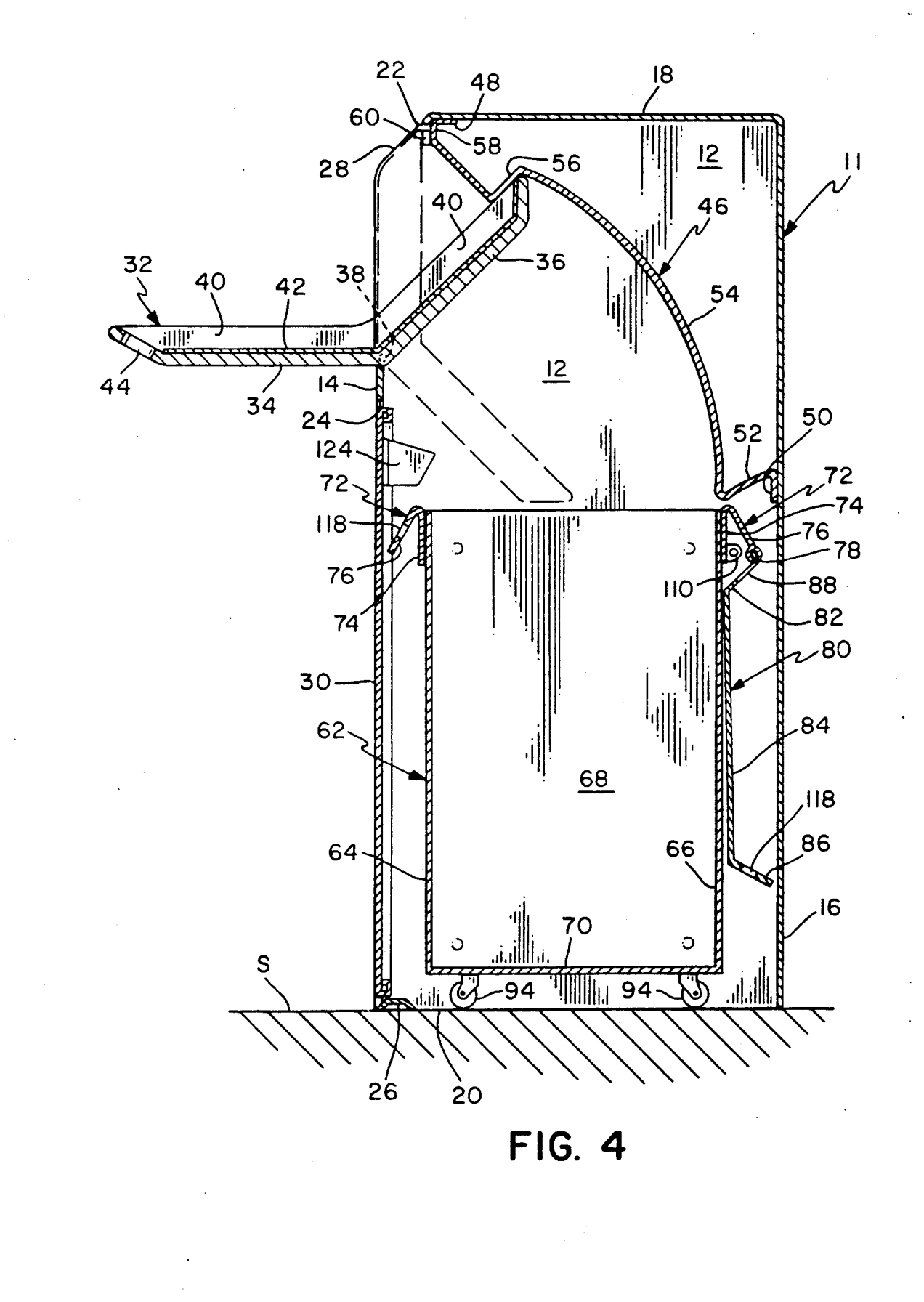

Referring particularly to FIGS. 1, 2 and 4, it may be seen that the security disposal cabinet and container assembly 10 includes a generally parallelepiped outer chassis or cabinet portion 11 having a pair of opposing left and right side walls 12, a front wall 14, a rear wall 16, a top wall 18, and a generally open bottom 20 defined by the respective bottom edges of the left and right side walls 12, front wall 14, and rear wall 16. The left and right side walls 12, front wall 14, rear wall 16, and top wall 18 may be constructed from panels of cut and folded sheet metal, or other conventional materials suitable to the location and application of the security disposal cabinet and container assembly 10.

The front wall 14 defines a small, generally rectangular first or upper opening 22 and a larger, generally rectangular second or lower opening 24. Each of the upper opening 22 and lower opening 24 have a width slightly less than the width of the front wall 14 measured between the opposing side walls 12, and each has a height, the combined heights of the upper opening 22 and lower opening 24 being slightly less than the height of the front wall 14 measured between the bottom thereof and the top wall 1.

Extending between the left and right side walls 12 at the bottom front ends thereof, and disposed beneath the lower opening 24, is a raised threshold channel 26 having a pair of angled or beveled sections facing upwardly and toward the front and rear. The top portion of the front wall 14 and the left and right side walls 12 define a rearwardly beveled or angled segment 28.

Figure 5:
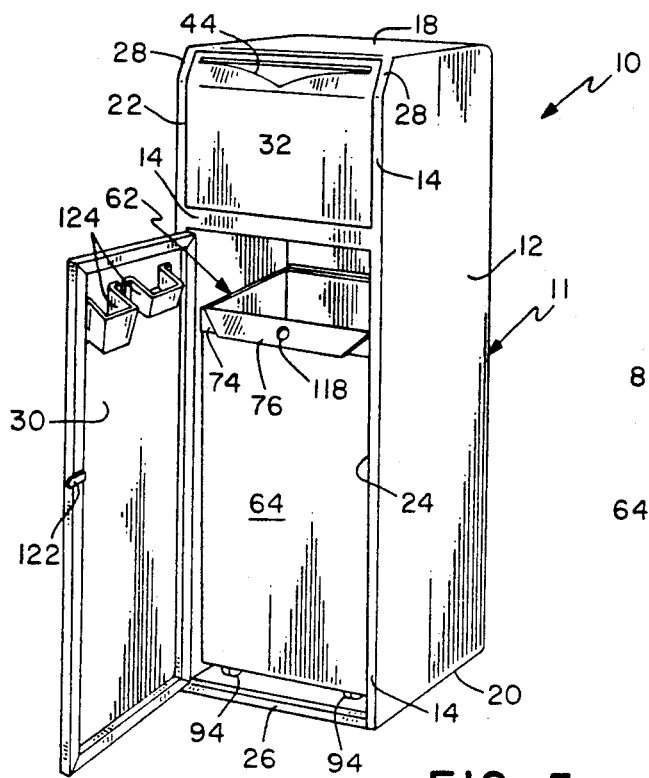
FIG. 5 is a front perspective view of the security disposal cabinet of FIG. 1 with the lower cabinet door open and the internal waste container shown.

Extending between the threshold channel 26 and the top and side edges of the lower opening 24 is a generally rectangular lower cabinet door 30 hingedly connected along one of the opposing side edges thereof to pivot between a closed position as shown in FIG. 2 and an open position as shown in FIG. 5.

Figure 3:
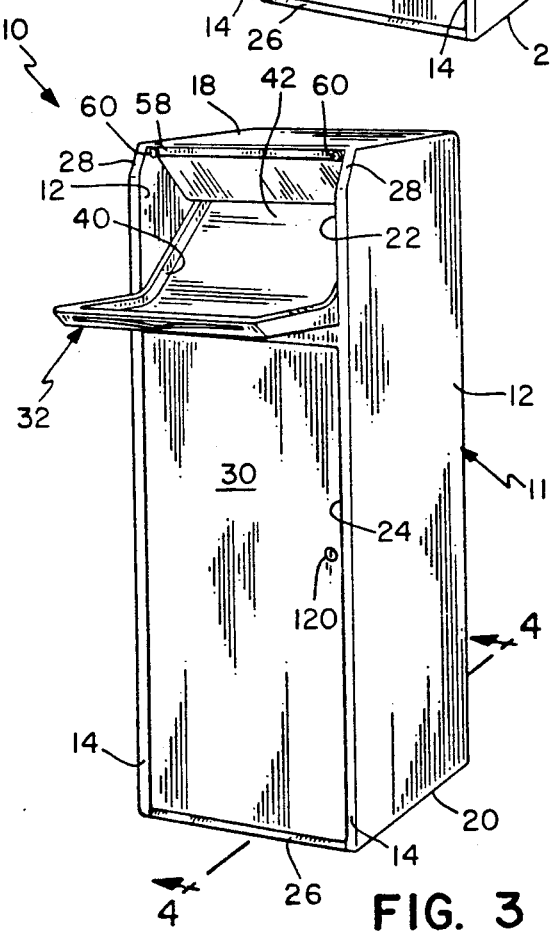
FIG. 3 is a front perspective view of the security disposal cabinet of FIG. 1 with the pivotal door open and the waste paper deposited inside.

Disposed in covering relation to the upper opening 22 is a pivotal door 32 which may be moved between a closed position as shown in FIG. 1, and in phantom in FIG. 4, and an open position as shown in FIGS. 3 and 4. The pivotal door 32 includes a front section 34 and a rear section 36. The front section 34 is oriented in a generally upright direction obstructing the first opening 22 when the pivotal door 32 is in the closed position, and in a generally horizontal direction extending forwardly from the front wall 14 when the pivotal door 32 is in the open position. The rear section 36 is oriented in a generally downward direction at an approximately 45° angle and extends rearwardly from the front wall 14 into the interior of the cabinet portion 11 when the pivotal door 32 is in the closed position, and is oriented in a generally upwardly angled direction when the pivotal door 32 is in the completely open position thereby at least partially obstructing the upper opening 22.

The front section 34 and rear section 36 of the pivotal door 32 are connected to one another at a common vertex to form a generally obtuse angle of approximately 135° relative to a normal horizontal plane. The pivotal door 32 is pivotally mounted to the opposing sides of the upper opening 22 in the front wall 14, or alternately to the opposing left and right side walls 12, on a common axle or pair of axle members 38 positioned at or closely proximate to the common vertex of the front section 34 and rear section 36, and defining a longitudinal axis of rotation around which the pivotal door 32 may be pivoted or rotated.

The pivotal door 32 further has a pair of spaced-apart raised side edges 40 disposed on opposite sides of the pivotal door 32 and extending upwardly from the front section 34 and rear section 36 generally perpendicular thereto, the raised side edges 40 extending substantially from the front to the back edges thereof and being joined along a generally curved center section. Attached to the top surfaces of the front section 34 and rear section 36, and extending between the raised side edges 40 and front to the back edges thereof, is a generally smooth covering providing a chute surface 42 fabricated from a slippery or friction reducing plastic or Teflon sheet material The front section 34 of the pivotal door 32 further defines a generally inverted isosceles triangular handgrip opening 44 having a generally straight, horizontal top edge and a pair of upwardly facing, convexly curved, inclined side edges, the bottom side edges being joined at the central ends thereof to form a downwardly pointing arrow.

Referring particularly to FIGS. 3 and 4, it may be seen that disposed within the interior of the cabinet portion of the cabinet and container assembly 10 is an generally curved upper partition 46. The upper partition 46 is fabricated from a generally rectangular panel folded as described, the upper partition 46 having a front flange member 48 extending along the front end thereof connected and attached to the underside or interior surface of the top wall 18, and further having by a similar rear flange member 50 at the opposing rear end of the partition 46 which is connected or attached to the the back wall 16. The partition 46 includes an inwardly and downwardly angled rear section 52 extending between and joining the top edge of the rear flange member 50 and the bottom rear edge of an upwardly convex curved or arcuate central section 54. The arcuate central section 54 has a radius greater than the length of the rear section 36 of the pivotal door 32 measured between the rear edge of the rear section 36 and the longitudinal axis of the axle members 38, the arcuate central section 54 being angled or oriented at an attitude such that the top of the arcuate central section is closely adjacent to the rear edge of the rear section 36 when the pivotal door 32 is in the open position, but such that the angled rear section 52 spaces the bottom rear edge of the arcuate central section 54 a predetermined distance from the rear wall 16 (and a predetermined height or distance from the floor or other planar surface s upon which the cabinet portion 11 rests) so that there is sufficient clearance between the rear edge of the rear section 36 of the pivotal door 32 and the bottom of the arcuate central section 54 when the pivotal door 32 is in the closed position.

Extending downwardly and forwardly from the top front edge of the arcuate central section 54 of the upper partition 46 is a rearwardly facing stop section 54 angled generally parallel with the top edge of the raised side edges 40 of the pivotal door, the upper partition 46 extending at an equal but opposite angle upwardly from the front edge of the stop section 56 to the lower edge of a generally vertical front section 58, the vertical front section 58 being connected to and adjoining the front flange member 48.

When in the fully or completely open position, the forward facing top surfaces of the raised side edges 40 of the rear section 36 of the pivotal door 32 contact the rear facing angled surface of the stop section 56 of the upper partition 46, such that the stop section 56 prevents the pivotal door 32 from being rotated or pivoted farther forward or open, and such that the front section 34 will be maintained in a generally horizontal position. Similarly, when in the fully or completely closed position, the rearward facing top surfaces of the raised side edges 40 of the front section 34 of the pivotal door 32 contact the forward facing surface of the vertical front section 58 of the upper partition 46. The front section 34 and rear section 36 of the pivotal door 32 are each approximately equally weighted such that the pivotal door 32 is balanced across the axle members 38 and will remain in the respective open or closed position When in the closed position, a strip or plurality of cushioning pads 60 may be disposed between and attached to either the top surfaces of the raised side edges 40 of the front section 34 or the rear facing angled surface of the stop section 56 of the upper partition 46.

Referring to FIGS. 4-7, it may be seen that a movable container 62 may be selectively and removably received within the interior region of the cabinet portion 11 of the security disposal cabinet and container assembly 10 beneath the upper partition 46 and the rear section 36 of the pivotal door 32, and positioned resting upon the planar surface S. A plurality of like movable containers 62 may be used in cooperation with one or more of the cabinets 11.

Figure 6:
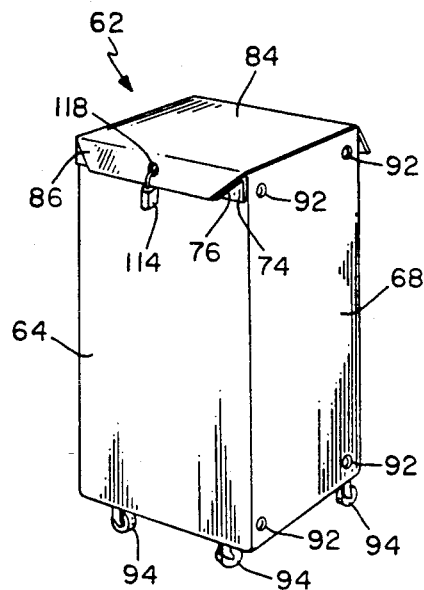
FIG. 6 is a front perspective view of the internal waste container of FIG. 5.
Figure 7:
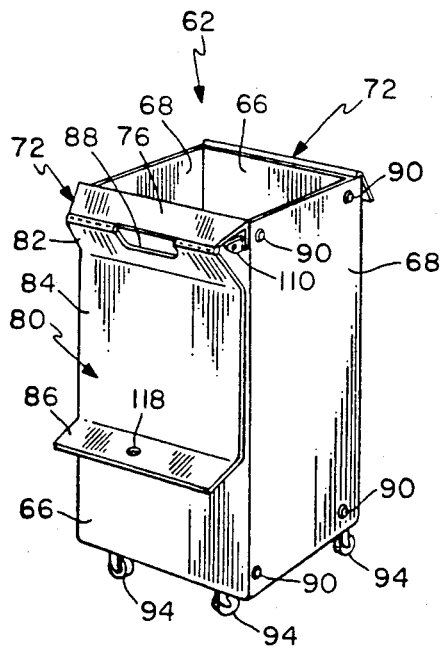
FIG. 7 is a front perspective view of the internal waste container of FIG. 6 with the container lid pivoted open.

Referring to FIGS. 4 and 6-7, it may be seen that the movable container 62 includes a generally rectangular front panel 64, generally rectangular rear panel 66, a pair of generally rectangular opposing side panels 68, and a generally square bottom panel 70 fabricated from a thin but resilient metal sheet material joined along the respective edges thereof and defining a generally rectangular open top receptacle region.

The movable container 62 is dimensioned such that it may be received through the lower opening 24 when the lower door 30 is in the open position, and further such that the bottom of the arcuate section 54 of the upper partition 46 is disposed generally above and closely proximate to the top edge of said rear panel 66 of the movable container 62 when the movable container 62 is positioned within the interior region of the outer cabinet 11

Attached to the outer planar surface of each of the front and rear panels 64, 66 are front and rear lid securing brackets 72, each lid securing bracket 72 having a generally vertical leg member 74 fixedly attached to the corresponding front or rear panel 64, 66 and an outwardly extending angled flange member 76 connected to the top edge of the corresponding vertical leg member 74. The bottom rear distal edge of the rear flange member 76 defines a longitudinal aperture within which a hinge rod 78 is slidably received. A container lid 80 is pivotally mounted on the hinge rod 78 to pivot between a completely closed position disposed above and in covering relation to the receptacle region of the movable container 62, and upwardly and rearwardly to a completely open position whereat the container lid 80 is disposed closely adjacent to and generally parallel with the rear panel 66 of the movable container 62.

Referring particularly to FIGS. 4, 6, and 7, the container lid 80 is folded from a generally planar sheet material of the same type from which the panels 64, 66, 68, and 70 are fabricated, and includes a rear depending segment 82, a generally square planar center lid section 84 extending from the rear depending segment 82, and a front depending segment 86 extending from the center lid section 84. The rear edge of the rear depending segment 82 defines a second longitudinal aperture within which the hinge rod 78 is slidably received, the portion of the rear depending segment 82 defining the longitudinal aperture overlapping and being aligned and cooperatingly mating with the portion of the bottom rear distal edge of the rear flange member 76.

The front and rear depending segments 82, 86 each form a generally obtuse angle with the center lid section 84, the associated obtuse angle being generally equal to the angle between the vertical leg member 74 and angled flange member 76 of the respective front or rear lid securing brackets 72. As such, when the container lid 80 is pivoted to the completely closed position as shown in FIG. 6, the lower surface of the front depending segment 82 will be disposed parallel to and in closely adjacent abutting contact with the top surface of the front lid securing bracket 72, and the rear depending segment 86 will be disposed parallel to and in closely adjacent abutting contact with the top surface of the rear lid securing bracket 72, with the generally square planar center lid section 84 disposed above and covering the receptacle region. When the center lid section 84 is disposed above the receptacle region in the completely closed position, the edges of the center lid section 84 are preferably disposed above and in covering and contacting relation to the top edges of the front panel 64, rear panel 66, and side panels 68.

Figure 11:
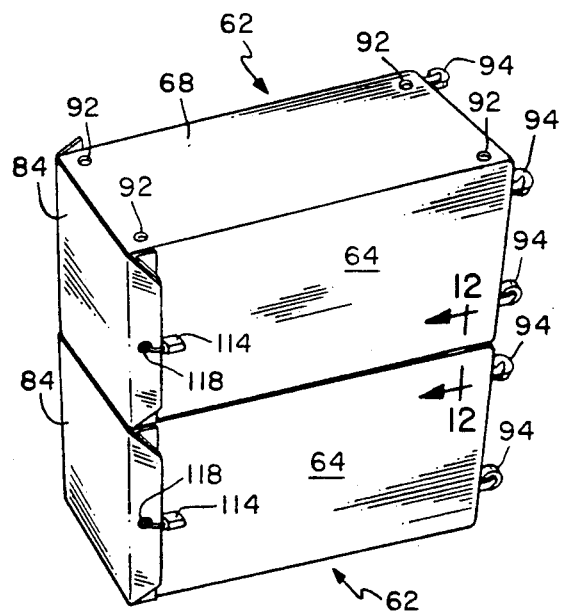
FIG. 11 is a front perspective view showing a pair of waste containers stacked together on their respective sides.
Figure 13:
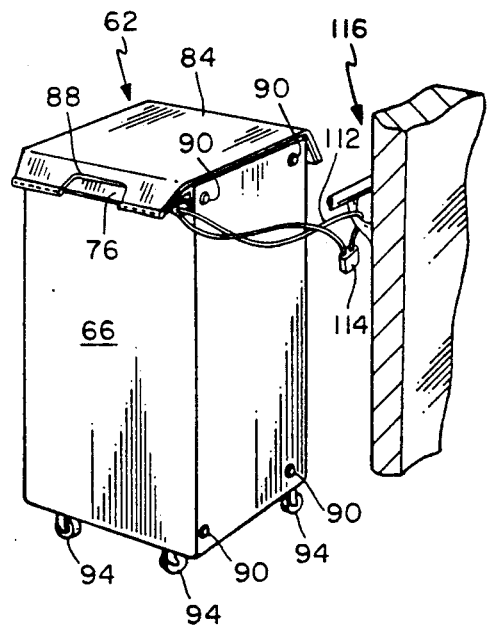
FIG. 13 is a rear perspective view of the internal waste container of FIG. 6 secured and locked to a stationary object.
Figure 12:
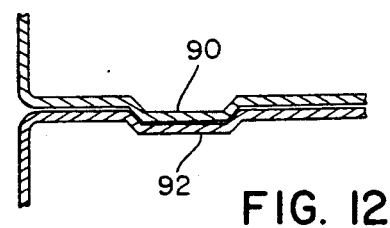
FIG. 12 is a partial section view of the stacked waste containers of FIG. 11 taken through line 12—12 of FIG. 11.

Referring to FIG. 7, it may be seen that the bottom edge of the rear depending segment 86 of the container lid 80 defines a handgrip opening 88 which permits a user access to the rear lid securing bracket 72 such that the front and rear lid securing brackets 72 may be used to grip and lift the movable container 62 when the container lid 80 is in either the completely open or completely closed position Referring to FIGS. 11-13, it may be seen that the opposing side walls 68 of each of the like movable containers 62 defines a plurality of truncated conical or radial bulges 90 and corresponding recesses or detents 92, the bulges 90 being positioned and arrayed on one of the left or right side wall 68 with the detents 92 being similarly arrayed on the opposing right or left side wall 68 such that several like movable containers 62 may be stacked in a vertical column on their sides with the bulges 90 being at least partially received within the corresponding detents 92 to maintain the movable containers 62 securely stacked in the column as shown in FIG. 11.

Figure 8:
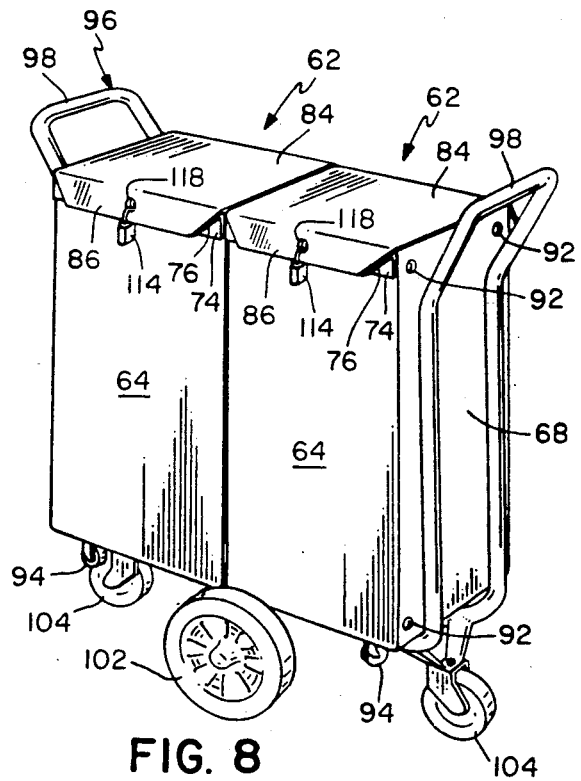
FIG. 8 is a front perspective view of a pair of the internal waste containers of FIG. 6 positioned on a mobile cart.
Figure 9:
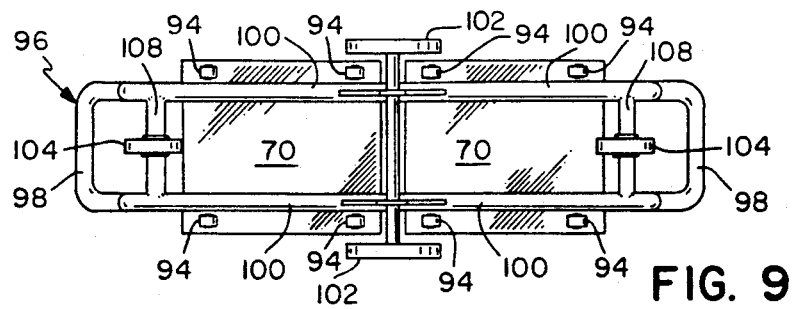
FIG. 9 is a bottom view of the waste containers and cart of FIG. 8 showing the wheels disposed outside the cart frame
Figure 10:
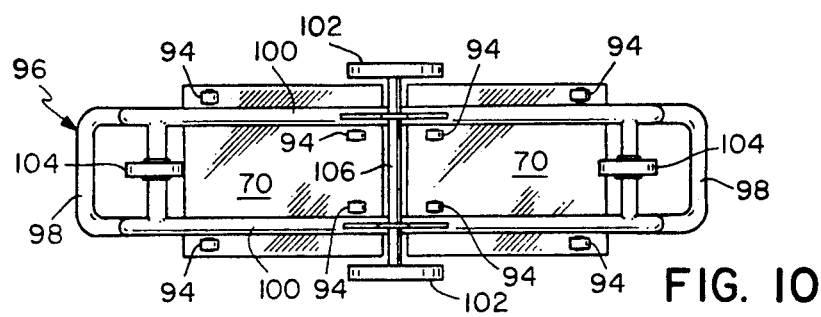
FIG. 10 is a bottom view of the waste containers and cart of FIG. 8 showing the wheels disposed alternately inside and outside the cart frame.

Referring to FIGS. 4 and 6, it may be seen that a plurality of castered wheels 94 are attached to the outer planar surface of the bottom panel 70, the castered wheels 94 being spaced apart so as to support the movable container 62 in a stable upright orientation when the movable container 62 is filled and is wheeled or transported on the castered wheels 94. Referring to FIGS. 8-10, it may be seen that a plurality of the movable containers 62 may be transported on a cart 96 having a pair of opposing upright handle segments 98, a pair of spaced-apart frame members 100 telescopingly connected and extending between the upright handle members 98, and a pair of major wheels 102 and minor wheels 104. The major wheels 102 are disposed on opposing sides of the cart 96 and are carried on a common axle 106 centered along the length of and traversing the width of the frame members 100 of the cart 96, while the minor wheels 104 are disposed on opposing ends of the cart 96 and are individually castered and mounted to cross members 108 extending between the spaced-apart frame members 100.

Referring particularly to FIGS. 9 and 10, it may be seen that the castered wheels 94 of each of the movable containers 62 may be positioned on the bottom panel 70 thereof such that when the movable containers 62 are positioned on the top surfaces of the frame members 100 of the cart 96 the castered wheels 94 may be disposed either straddling the outer sides of the frame members 100 as shown in FIG. 9, or paired opposing one another alternatingly on the inside and outside of the frame members 100 as shown in FIG. 10.

Referring to FIG. 13 it may be seen that the movable containers 62 may include a security bracket or flange 110 defining an aperture through which a chain or cable 112 may be inserted, and the movable container 62 secured with the cable 112 and a padlock 114 to a fixed object 116 such as a railing or other physical structure at a predetermined location in a building.

The angled flange member 76 of the front lid securing bracket 72 and the front depending segment 86 of the container lid 80 each define a corresponding and aligned circular locking aperture 118 through which the shank of a padlock 114 may be passed in order to secure the container lid 80 in the completely closed position when the lower surface of the front depending segment 82 is disposed parallel to and in closely adjacent abutting contact with the top surface of the front lid securing bracket 72.

Referring to FIGS. 3 and 5, it may be seen that the lower cabinet door 30 includes a keyed lock 120 disposed proximate to the edge thereof, the lock 120 having a rotating tang 122 which may be received behind or within a slot or bracket defined by edge of the front wall 14 or adjacent side wall 12 to lock the lower cabinet door 30 in a closed position covering and blocking the lower opening 24.

Referring particularly to FIGS. 4 and 5, it may be seen that the lower cabinet door 30 defines a recessed interior surface on which may be mounted one or more utility trays 124, the utility trays 124 being sized and positioned so as to be received beneath the rear section 36 of the pivotal door 32 in either the open or closed position, and above thee open top receptacle region and front wall 64 of the movable container 62. The utility trays 124 are preferably sized to receive a box of bags (not shown) which may be used as replacement liners for the movable container 62 and to hold a padlock 114 used to secure the container lid 80 in the closed position on the movable container 62 when the movable container 62 is removed from the security disposal cabinet 10.

The security disposal cabinet and container assembly 10 has an overall height, width, and depth permitting it to be placed between or adjacent to conventional drawered filing cabinets 126, as shown in FIG. 1.

In operation, the security disposal cabinet and container assembly 10 is placed in a convenient location either alone or in a bank of conventional drawered filing cabinets 126. The lower cabinet door 30 is opened exposing the interior of the security disposal cabinet 10. The container lid 80 of a disposal container 62 is pivoted to the completely open position, a liner bag (not shown) is removed from one of the utility trays 124 and placed in the receptacle region of the movable container 62, and the movable container 62 is wheeled through the lower opening 24 and over the threshold channel 26 into the interior of the cabinet portion 11 of the security disposal cabinet and container assembly 10 with the container lid 80 disposed adjacent to the rear wall 16 of the security disposal cabinet 10. The padlock 114 is placed in the utility tray 124 on the lower cabinet door 30, and the lower cabinet door 30 is pivoted to the closed position and secured using the keyed lock 120.

A person desiring to dispose of a load or stack of waste paper 128 may open the pivotal door 32 by grasping the front section 34 of the pivotal door 32 through the handgrip opening 44, with the palm and fingers of a taller person facing upward such that their fingers grip or contact the straight top edge of the handgrip opening 44, and such that the palm and fingers of a shorter person will grip or contact one of the upwardly facing, convexly curved bottom side edges of the handgrip opening 44.

The person may then pull forwardly and downwardly on the front section 34 of the pivotal door 32 such that the pivotal door 32 pivots on the axle members 38, lowering the front section 34 and raising the rear section 36 thereof until the top surface of the raised side edges 40 contact the rear face of the stop section 56 of the upper partition 46, and the front section 34 of the pivotal door 32 is oriented in the completely open and generally horizontal waste material receiving position shown in FIG. 3. The stack of waste paper 128 may then be placed on the upper surface of the chute surface 42 of the pivotal door 32 between the raised side edges 40 thereof, and the front section 34 of the pivotal door 32 may be lifted and pivoted upwardly and rearwardly until the top surfaces of the raised side edges 40 contact the vertical front section 58 of the upper partition 46. As the front section 34 is raised, the chute surface will approach a critical angle relative to horizontal at which gravity will overcome the friction between the bottom of the stack of waste paper 128 and the chute surface 42, and the stack of waste paper 128 will slide along the chute surface 42 across the front section 34 and rear section 36 of the pivotal door 32 across the rear edge thereof, and fall downwardly into the center of the receptacle region of the movable container 62. While the rear edge of the rear section 36 of the pivotal door 32 will be disposed above the approximate center of the open top receptacle region, the upper partition 46 and rear panel 66 of the movable container 62 will thereby assist or aim the load of waste materials 128 into the open top receptacle region of the movable container 62 as the load of waste materials 128 slides rearwardly along and falls from the pivotal door 32, and not permit the load of waste materials 128 from falling or being caught behind the movable container 62 due to its rearward momentum.

At this point, the pivotal door 32 may be reopened and more waste paper 128 disposed using the pivotal door 32, however the close proximity of the arcuate section 54 of the upper partition 46 to the rear edge of the rear section 36 of the pivotal door 32 prevents a person from reaching into the lower interior region of the cabinet portion 11 of the security disposal cabinet and container assembly 10 and removing waste paper 128 or materials from the movable container 62.

Once filled with waste paper 128, the movable container 62 may be removed from the interior of the cabinet 11 by unlocking the lower cabinet door 30 and wheeling the movable container 62 over the threshold channel 26. The container lid 80 may be pivoted upwardly and forwardly from its position against the rear panel 66 of the movable container 62, and downwardly into a covering position disposed over the open top of the receptacle region such that the edges of the center lid section 84 cover the top edges of the front panel 64, rear panel 66, and side panels 68 of the movable container 62. The container lid 80 may be locked in the closed position by passing the shank of a padlock 114 through the locking apertures 118 of the front lid securing bracket 72 and the front depending segment 86 of the container lid 80 and closing the padlock 114.

An empty movable container 62 can then be placed inside the cabinet 11, with a replacement padlock being placed in one of the utility trays 124 on the inside of the lower cabinet door 30, and if desired a bag may be removed from one of the utility trays 124 and placed inside the empty movable container 62.

The filled movable container 62 may then be placed at a predetermined location for later collection, being locked to a fixed object or structure 116 during the intervening period as shown in FIG. 13, or may be immediately transported to a loading dock, truck, or on-site disposal facility.

To transport one or more of the movable containers 62 to a predetermined location, the movable containers 62 may be placed on the wheeled cart 96 with the castered wheels 94 of the movable container 62 engaged in a straddled or alternating position relative to the frame members 100 of the cart 96, as shown in FIGS. 9 and 10 respectively, and the cart 96 may then be wheeled to a location such as a loading dock or disposal facility.

The movable containers 62 may then be emptied into on-site waste disposal mechanism or loaded on a truck or other vehicle (not shown) to be emptied at a remote location. In order to empty each movable container 62, the container lids 80 may be opened, and the bags of waste paper 128 removed. Alternately, the movable containers 62 may be individually lifted and inverted by a person grasping the underside of the extending angled flange member 76 of each of the front and rear lid securing brackets 72, the angled flange member 76 of the rear lid securing brackets 72 being accessed by the person inserting their fingers palm up through the handgrip opening 88 defined by the bottom edge of the rear depending segment 86 of the container lid 80 when the container lid 80 is in the completely open position as shown in FIG. 7.

If a plurality of the movable containers 62 are to be transported in a vehicle to a remote disposal or processing facility, the movable containers 62 may be stacked one on top of another in a generally vertical column on their sides with the bulges 90 on the side panels 68 of one movable container 62 aligned with and engaging the recesses or detents 92 of the movable container 62 disposed above or below, as shown in FIGS. 11 and 12, to prevent the like movable containers 62 from shifting or sliding relative to one another.

While the preferred embodiment of the above security disposal cabinet and container assembly 10 has been described in detail above with reference to the attached drawing figures, it is understood that various changes and adaptations may be made in the security disposal cabinet and container assembly 10 without departing from the spirit and scope of the appended claims.

What is claimed is:

1. A cabinet and container assembly for the disposal of a load of waste material having a confidential nature, said cabinet and container assembly comprising:

an outer cabinet defining an interior region which is generally enclosed, said outer cabinet having a pair of opposing side walls, a front wall, a rear wall, and a top wall, said outer cabinet defining a first opening and a second opening;

a first door, said first door being pivotally connected to and mounted on said outer cabinet closely adjacent to said first opening so as to be movable between a closed position in covering relation to said first opening and an open position displaced form said closed position, said first door defining a front section and a rear section, said front section and said rear section defining a chute surface extending generally therebetween, said front section forming a generally horizontal tray when said first door is moved to said open position such that the load of waste material may be placed thereon, the load of waste material sliding on said chute surface from said front section to said rear section when said first door is pivoted to said closed position, at least a portion of said rear section contacting a portion of said outer cabinet when said first door is in said open position to prevent said front section from being pivoted forward or downward substantially beyond said open position forming said generally horizontal tray, said rear section of said first door having a rear edge and being oriented in a generally downwardly angled direction when said first door is in said closed position;

a second door, said second door being mounted on said cabinet closely adjacent to said second opening so as to be movable between a closed position in covering relation to said second opening and an open position displaced from said closed position; and a movable container, said movable container having a generally open top and defining a receptacle region, said movable container being dimensioned so as to be removably received within said interior region of said outer cabinet through said second opening when said second door is in said open position, said movable container being positioned within said interior region beneath said rear edge of said rear section of said first door, whereby the load of waste material placed on the front section of the first door when the first door is in the open position will slide on the chute surface from the front section to the rear section and across the rear edge thereof as the first door is moved to the closed position, the load of waste material thereby falling downwardly and being deposited within the receptacle region of the movable container.

2. The cabinet and container assembly of claim 1 wherein the rear section of first door is oriented in a generally upwardly angled direction when the first door is in the open position, the rear section of the first door thereby at least partially obstructing the first opening when the first door is in the open position.

3. The cabinet and container assembly of claim 1 wherein the movable container has a front panel and a rear panel, the open top receptacle region of the movable container further having a center measured between said front panel and said rear panel thereof, and wherein the rear edge of the rear section of the first door is disposed proximate to the open top receptacle region and substantially over said center of the open top receptacle region when the first door is in the closed position.

4. The cabinet and container assembly of claim 1 wherein the first door is moved between the open position and the closed position by a user, and wherein the first door is mounted for pivotal movement on at least one axle member, the front section and the rear section of the first door each being weighted such that the first door is balanced across said axle member so as to remain in the open position until selectively moved to the closed position by the user, and to remain in the closed position until selectively moved to the open position by the user.

5. The cabinet and container assembly of claim 1 wherein the first door is selectively moved between the closed position and the open position by a user with a hand having palm side, and wherein the front section of the first door defines a handgrip opening, said handgrip opening having a generally inverted triangular shape including a generally horizontal top edge and at least one downwardly inclined side edge, such that the user may grip said top edge of said handgrip opening by inserting their hand partially through said handgrip opening with the palm side thereof facing generally upward, or may alternately grip said downwardly inclined side edge of said handgrip opening by inserting their hand partially through said handgrip opening with the palm side thereof facing generally downward.

6. The cabinet and container assembly of claim 5 wherein the number of downwardly inclined side edges of the handgrip opening is two, and wherein the generally inverted triangular shape is an isosceles triangle.

7. The cabinet and container assembly of claim 5 wherein front section of the first door defines a rearwardly beveled segment proximate to the top edge of the handgrip opening.

8. The cabinet and container assembly of claim 1 further comprising:
an upper partition, said upper partition being disposed within the interior region of the outer cabinet and connected thereto, said upper partition defining a generally curved section having a top and a bottom, said top of said curved section being disposed closely adjacent to the rear edge of the rear section of the first door when the first door is in the open position, the bottom edge of the curved section being displaced from the rear edge of the rear section of the first door when the first door is in the closed position, whereby the curved section obstructs a person from reaching into the interior region of the outer cabinet substantially beyond the rear edge of the rear section of the first door when the first door is in the open position, and whereby the load of waste material may fall between the rear edge of the rear section of the first door and the bottom of the curved section of the upper partition when the first door is in the closed position.

9. The cabinet and container assembly of claim 8 wherein the movable container has a rear panel having a top edge and rests on a generally planar surface when positioned within the interior region of the outer cabinet, and wherein the bottom of the curved section of the upper partition is spaced a predetermined distance from the back wall of the outer cabinet and a predetermined distance from said generally planar surface such that the bottom of the curved section is disposed generally above and proximate to said to edge of said rear panel when the movable container is disposed within the interior region of the outer cabinet, the upper partition and the rear panel thereby assisting the load of waste materials to be deposited in the open top receptacle region of the movable container as the load of waste materials slides along and falls from the first door.

10. The cabinet and container assembly of claim 8 wherein the upper partition further defines a stop section extending downwardly from the top of the curved section, there are section of the first door contacting said stop section when the first door is moved to the open position, whereby the stop section prevents the front section of the first door from being pivoted farther forward or downward than the open position.

11. The cabinet and container assembly of claim 10 wherein the rear section of the first door has a pair of raised sides, each raised side having a top edge, and wherein the stop section extends downwardly from the top of the curved section of the upper partition at an angle, said angle being such that said top edge of each of said raised sides of the rear section of the first door is generally parallel to the stop section when the first door is in the open position.

12. The cabinet and container assembly of claim 11 whereni the raised sides of the rear section of the first door are spaced apart on opposing sides of the chute surface.

* * * * *